US009892487B1

(12) United States Patent
Wong

(10) Patent No.: US 9,892,487 B1
(45) Date of Patent: Feb. 13, 2018

(54) METHOD AND APPARATUS FOR COMBINING PIXEL VALUES IN ARRAY INCLUDING LINEAR PIXELS AND LOGARITHMIC PIXELS

(71) Applicant: Sony Corporation, Tokyo (JP)

(72) Inventor: Ping Wah Wong, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/361,958

(22) Filed: Nov. 28, 2016

(51) Int. Cl.
*G06T 3/40* (2006.01)
*H04N 9/64* (2006.01)
*H04N 9/73* (2006.01)
*H04N 5/235* (2006.01)
*H04N 5/355* (2011.01)

(52) U.S. Cl.
CPC ......... *G06T 3/4015* (2013.01); *H04N 5/2355* (2013.01); *H04N 5/35518* (2013.01); *H04N 9/646* (2013.01); *H04N 9/735* (2013.01); *G06T 2200/28* (2013.01); *G06T 2200/32* (2013.01); *H04N 5/35509* (2013.01)

(58) Field of Classification Search
CPC ..... G06T 3/4007; G06T 3/4015; G06T 3/403; G06T 3/4038; H04N 5/2355; H04N 5/35509; H04N 5/35518; H04N 5/35527; H04N 5/35536; H04N 5/35545; H04N 5/35554; H04N 5/35563; H04N 5/235; H04N 5/155; H04N 5/35581; H04N 3/155; H04N 2209/045; H04N 2209/046; H04N 5/35572; H01L 27/14643; H01L 27/14609; H01L 27/148; H01L 27/14621; H01L 27/14645; G01J 1/4228; G01J 3/51; G01J 3/513
See application file for complete search history.

(56) References Cited

U.S. PATENT DOCUMENTS

| | | | | |
|---|---|---|---|---|
| 5,189,511 A | * | 2/1993 | Parulski | H04N 1/409 358/518 |
| 5,801,773 A | * | 9/1998 | Ikeda | H04N 5/20 348/229.1 |
| 6,011,251 A | * | 1/2000 | Dierickx | H01L 27/14643 250/208.1 |
| 7,609,299 B2 | * | 10/2009 | Nakamura | H01L 27/14609 348/222.1 |
| 7,645,978 B2 | * | 1/2010 | Kamon | H04N 3/155 250/214 A |

(Continued)

*Primary Examiner* — Michael Osinski
(74) *Attorney, Agent, or Firm* — Michael Best & Friedrich LLP

(57) ABSTRACT

A signal processing circuit, a method of processing an image, and an imaging device are disclosed. In one example of the present disclosure, the signal processing circuit includes image processing circuitry configured to receive a first set of signals corresponding to linear pixels in an array of pixels, receive a second set of signals corresponding to logarithmic pixels in the array of pixels, perform a linear pixel interpolation using the first set of signals to determine a linear rgb value associated with a given pixel in the array of pixels, perform a logarithmic pixel interpolation using the second set of signals to determine a logarithmic RGB value associated with the given pixel in the array of pixels, and combine the linear rgb value and the logarithmic RGB value to generate a combined pixel value associated with the given pixel in the array of pixels.

21 Claims, 12 Drawing Sheets

(56) References Cited

U.S. PATENT DOCUMENTS

| | | | | |
|---|---|---|---|---|
| 8,405,750 B2 * | 3/2013 | Smith | | H04N 5/235 |
| | | | | 348/308 |
| 8,576,307 B2 * | 11/2013 | Katagiri | | H04N 5/35527 |
| | | | | 348/187 |
| 8,792,017 B2 * | 7/2014 | Kamon | | H04N 5/217 |
| | | | | 348/222.1 |
| 8,830,364 B2 * | 9/2014 | Wada | | H04N 9/045 |
| | | | | 348/208.99 |
| 9,131,199 B2 * | 9/2015 | Takahashi | | H04N 9/735 |
| 9,294,740 B2 * | 3/2016 | Kamon | | H04N 9/045 |
| 9,538,092 B2 * | 1/2017 | Mody | | H04N 5/345 |
| 2002/0021121 A1 * | 2/2002 | Nakamura | | H01L 27/14609 |
| | | | | 324/96 |
| 2004/0196398 A1 * | 10/2004 | Doering | | H01L 27/14609 |
| | | | | 348/308 |
| 2004/0227109 A1 * | 11/2004 | Storm | | H04N 5/335 |
| | | | | 250/551 |
| 2005/0036041 A1 * | 2/2005 | Gallagher | | H04N 3/155 |
| | | | | 348/222.1 |
| 2005/0052547 A1 * | 3/2005 | Minakuti | | H04N 9/735 |
| | | | | 348/224.1 |
| 2005/0099509 A1 * | 5/2005 | Kobayashi | | H04N 5/235 |
| | | | | 348/229.1 |
| 2006/0215908 A1 * | 9/2006 | Kamon | | H04N 1/6088 |
| | | | | 382/167 |
| 2008/0159646 A1 * | 7/2008 | Katagiri | | H04N 5/20 |
| | | | | 382/266 |
| 2008/0179490 A1 * | 7/2008 | Ohno | | G01J 1/4228 |
| | | | | 250/201.1 |
| 2008/0219585 A1 * | 9/2008 | Kasai | | H04N 5/2351 |
| | | | | 382/274 |
| 2008/0251695 A1 * | 10/2008 | Kamon | | H04N 3/155 |
| | | | | 250/208.1 |
| 2008/0260298 A1 * | 10/2008 | Kamon | | H04N 3/155 |
| | | | | 382/321 |
| 2009/0059040 A1 * | 3/2009 | Kamon | | H04N 5/217 |
| | | | | 348/241 |
| 2009/0251571 A1 * | 10/2009 | Takayama | | H04N 5/335 |
| | | | | 348/241 |
| 2010/0309333 A1 * | 12/2010 | Smith | | H04N 5/235 |
| | | | | 348/230.1 |
| 2011/0122282 A1 * | 5/2011 | Katagiri | | H04N 5/35527 |
| | | | | 348/222.1 |
| 2012/0092539 A1 * | 4/2012 | Katagiri | | H04N 5/2355 |
| | | | | 348/302 |
| 2012/0280112 A1 * | 11/2012 | Collins | | H04N 5/3535 |
| | | | | 250/208.1 |
| 2013/0208117 A1 * | 8/2013 | Kamon | | H04N 9/045 |
| | | | | 348/148 |
| 2013/0278791 A1 * | 10/2013 | Takahashi | | H04N 9/735 |
| | | | | 348/223.1 |
| 2015/0207974 A1 * | 7/2015 | Mody | | H04N 5/345 |
| | | | | 348/296 |

* cited by examiner

METHOD AND APPARATUS FOR COMBINING PIXEL VALUES IN ARRAY INCLUDING LINEAR PIXELS AND LOGARITHMIC PIXELS

BACKGROUND OF THE INVENTION

1. Field of the Invention

This application relates to a method and apparatus for combining pixel values from an array of pixels that includes both linear pixels and logarithmic pixels.

2. Description of Related Art

Image sensing devices typically include an image sensor, an array of pixel circuits, signal processing circuitry and associated control circuitry. Within the image sensor itself, charge is collected in a photoelectric conversion device of the pixel circuit as a result of impinging light. Subsequently, the charge in a given pixel circuit is read out as an analog signal, and the analog signal is converted to digital form by an analog-to-digital converter (ADC).

As a photoelectric conversion device, a photodiode may be used. The photodiodes are limited by well capacity (for example, the maximum amount of charge that may be stored during the exposure to light). Moreover, the analog circuits in the entire image sensor system, including the photodiodes, are subject to noise. As a result, the dynamic range (for example, the ratio of the maximum to minimum light level in a single scene that may be captured by the image sensor at a given setting) is restricted.

To expand the dynamic range, various conventional methods may be used. Some examples of the conventional methods include the use of sensor elements having non-linear responses to light (for example, piecewise linear response segments with different slopes, or logarithmic pixel elements), capturing multiple frames at different sensor settings and subsequently combining the frames into a single output frame, partitioning pixels within a frame into multiple groups with different sensor settings and reconstructing an output frame with digital signal processing, and the use of individually controlled pixel elements.

Traditional pixel elements have an approximately linear response to light ("linear pixels") that results in a signal level, and thus a converted digital value, that is approximately linearly proportional to the product of the light level and the exposure time. However, above a certain product a linear pixel may be become saturated or "clipped." Accordingly, linear pixels may not give values that are consistent with a linear characteristic at high light levels, long exposure times, or combinations thereof.

Pixel elements may also have an approximately logarithmic response to light ("logarithmic pixels") that may provide a different or wider dynamic range. Logarithmic pixels, however, may have undesirable characteristics at the lower end. Accordingly, logarithmic pixels may not give values that are consistent with a logarithmic characteristic at low light levels, short exposure times, or combinations thereof.

BRIEF SUMMARY OF THE INVENTION

Linear and logarithmic pixels operate according to a linear and a logarithmic characteristics, respectively, in different illumination ranges, and are best suited for different ends of a given dynamic range. However, it is difficult to incorporate both linear pixels and logarithmic pixels in a single image sensor for several reasons. For example, traditional demosaicing algorithms do not produce a suitable output image for a color array including both types of pixels. Moreover, in a scene having a wide illumination range, linear pixels may be clipped in a high-light area of the scene while logarithmic pixels may be clipped in a low-light area of the scene. Linear pixels and logarithmic pixels may be distributed throughout the pixel array and a significant portion of the pixels may be saturated, which may degrade an image output.

Accordingly, there exists a need for a demosaicing method for implementation in a color image sensor having both linear and logarithmic pixels (for example, a "dual pixel image sensor") that does not suffer from these and other deficiencies.

Various aspects of the present disclosure relate to signal processing circuitry, a method for processing an image, and an imaging device that includes an array of pixels having linear pixels and logarithmic pixels and an image processing circuit. The signal processing circuitry may be internal or external with respect to the imaging device that includes an array of pixels.

In one aspect of the present disclosure, a signal processing circuit comprises an image processing circuitry including first circuitry configured to receive a first set of signals corresponding to linear pixels in an array of pixels, second circuitry configured to receive a second set of signals corresponding to logarithmic pixels in the array of pixels, third circuitry configured to perform a linear pixel interpolation using the first set of signals to determine a linear red-green-blue (rgb) value associated with a given pixel in the array of pixels, fourth circuitry configured to perform a logarithmic pixel interpolation using the second set of signals to determine a logarithmic Red-Green-Blue (RGB) value associated with the given pixel in the array of pixels, and responsive to determining the linear rgb value and the logarithmic RGB value associated with the given pixel in the array of pixels, fifth circuitry is configured to combine the linear rgb value and the logarithmic RGB value associated with the given pixel in the array of pixels to generate a combined pixel value associated with the given pixel in the array of pixels.

In another aspect of the present disclosure, a method of processing an image includes receiving a first set of signals corresponding to linear pixels in an array of pixels, receiving a second set of signals corresponding to logarithmic pixels in the array of pixels, performing a linear pixel interpolation using the first set of signals to determine a linear red-green-blue (rgb) value associated with a given pixel in the array of pixels, performing a logarithmic pixel interpolation using the second set of signals to determine a logarithmic Red-Green-Blue (RGB) value associated with the given pixel in the array of pixels, and responsive to determining the linear rgb value and the logarithmic RGB value associated with the given pixel in the array of pixels, combining the linear rgb value and the logarithmic RGB value associated with the given pixel in the array of pixels to generate a combined pixel value associated with the given pixel in the array of pixels.

In yet another aspect of the present disclosure, an imaging device comprising an array of pixels including linear pixels and logarithmic pixels and an image processing circuit. The linear pixels are configured to output a first set of signals based on light incident upon the linear pixels. The logarithmic pixels are configured to output a second set of signals based on the light incident upon the logarithmic pixels. The image processing circuit is configured to receive the first set of signals and the second set of signals, perform a linear pixel interpolation using the first set of signals to determine a linear red-green-blue (rgb) value associated with a given pixel in the array of pixels, perform a logarithmic pixel interpolation using the second set of signals to determine a logarithmic Red-Green-Blue (RGB) value associated with the given pixel in the array of pixels, and responsive to determining the linear rgb value and the logarithmic RGB value associated with the given pixel in the array of pixels, combine the linear rgb value and the logarithmic RGB value associated with the given pixel in the array of pixels to generate a combined pixel value associated with the given pixel in the array of pixels.

In another aspect of the present disclosure, a non-transitory computer-readable medium comprising instructions that, when executed by an electronic processor, perform a set of functions, the set of functions comprising performing a linear pixel interpolation using a first set of signals to determine a linear red-green-blue (rgb) value associated with a given pixel in an array of pixels, performing a logarithmic pixel interpolation using a second set of signals to determine a logarithmic Red-Green-Blue (RGB value associated with the given pixel in the array of pixels, and responsive to determining the linear rgb value and the logarithmic RGB value associated with the given pixel in the array of pixels, combining the linear rgb value and the logarithmic RGB value associated with the given pixel in the array of pixels to generate a combined pixel value associated with the given pixel in the array of pixels.

This disclosure may be embodied in various forms, including hardware or circuits controlled by computer-implemented methods, computer program products, computer systems and networks, user interfaces, and application programming interfaces; as well as hardware-implemented methods, signal processing circuits, image sensor circuits, application specific integrated circuits, field programmable gate arrays, and other suitable forms. The foregoing summary is intended solely to give a general idea of various aspects of the present disclosure, and does not limit the scope of the present disclosure.

DESCRIPTION OF THE DRAWINGS

These and other more detailed and specific features of various embodiments are more fully disclosed in the following description, reference being had to the accompanying drawings, in which:

FIGS. 16A and 16B illustrate exemplary subsets of the five by five array of pixels of FIG. 14 used in estimating a gradient strength and directional interpolated result in the horizontal direction.

FIG. 17 illustrates an exemplary seven by seven array of pixels for determining the red and blue component values associated with the output pixel, in accordance with various aspects of the present disclosure.

DETAILED DESCRIPTION

In the following description, numerous details are set forth, such as flowcharts, data tables, and system configurations. It will be readily apparent to one skilled in the art that these specific details are exemplary and do not to limit the scope of this application.

In this manner, the present disclosure provides improvements in the technical field of signal processing, as well as in the related technical fields of image sensing and image processing.

[Image Sensor]

Figure 1:
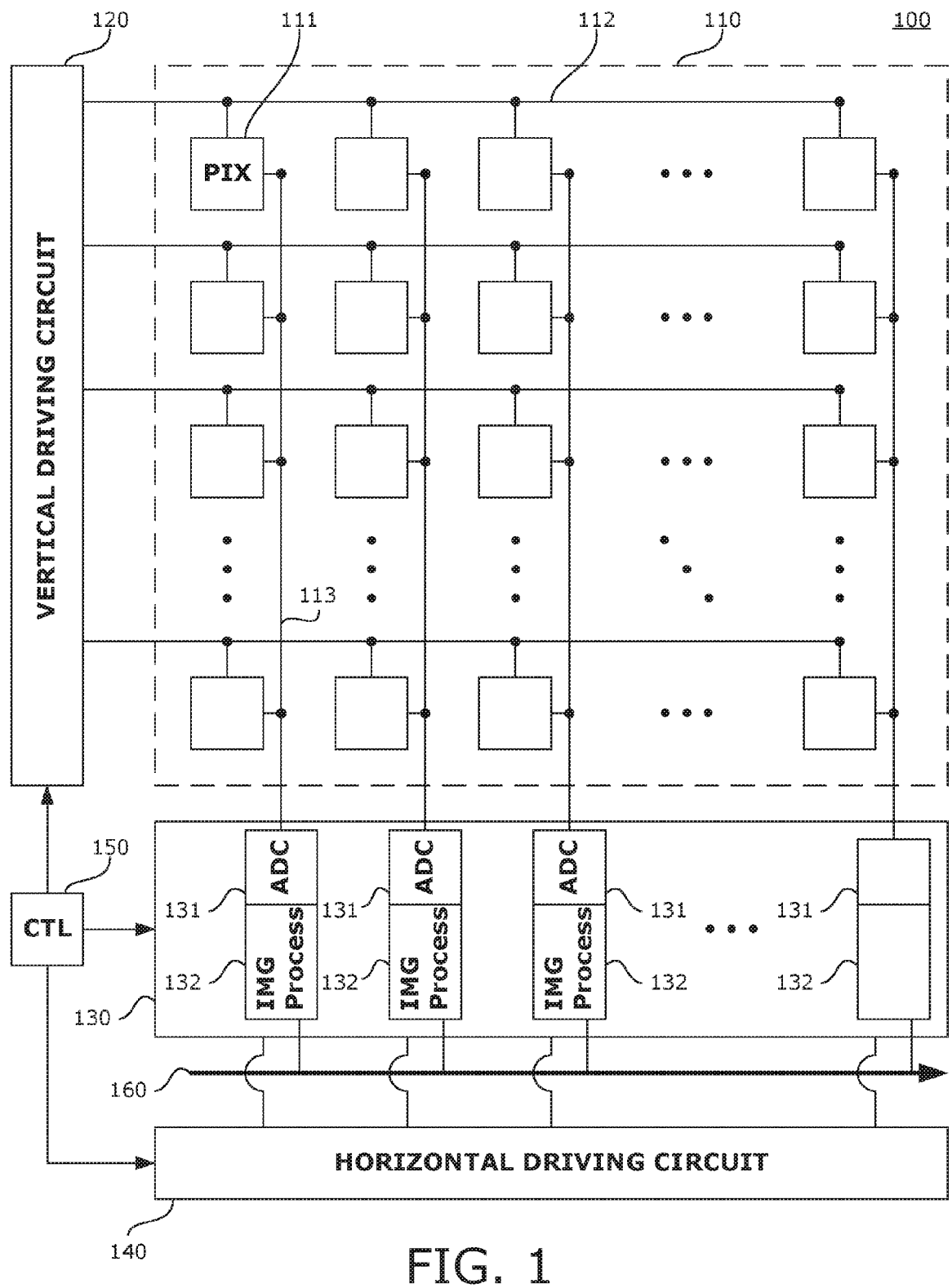
FIG. 1 illustrates an exemplary image sensor, in accordance with some aspects of the present disclosure.

FIG. 1 illustrates an exemplary image sensor 100, in accordance with various aspects of the present disclosure. The image sensor 100 includes an array 110 of pixels 111 located at intersections where horizontal signal lines 112 and vertical signal lines 113 cross one another. Each of the pixels 111 may be one of a linear type or a logarithmic type. The horizontal signal lines 112 are operatively connected to a vertical driving circuit 120 (for example, a row scanning circuit) at a point outside of the array 110. The horizontal signal lines 112 carry signals from the vertical driving circuit 120 to a particular row of the array 110 of pixels 111. The pixels 111 in a particular column output an analog signal corresponding to an amount of incident light to the pixels in the vertical signal line 113. For illustration purposes, only a small number of the pixels 111 are actually shown in FIG. 1. In some examples, the image sensor 100 may have tens of millions of pixels 111 (for example, "megapixels" or MP) or more.

The vertical signal line 113 conducts the analog signal for a particular column to a column circuit 130. In the example of FIG. 1, one vertical signal line 113 is used for each column in the array 110. In other examples, more than one vertical signal line 113 may be provided for each column. In yet other examples, each vertical signal line 113 may correspond to more than one column in the array 110. The column circuit 130 may include one or more individual analog to digital converters (ADC) 131 and image processing circuits 132. As illustrated in FIG. 1, the column circuit 130 includes an ADC 131 and an image processing circuit 132 for each vertical signal line 113. In other examples, each set of ADC 131 and image processing circuit 132 may correspond to more than one vertical signal line 113.

The column circuit 130 is at least partially controlled by a horizontal driving circuit 140 (for example, a column scanning circuit). Each of the vertical driving circuit 120, the column circuit 130, and the horizontal driving circuit 140 receive one or more clock signals from a controller 150. The controller 150 controls the timing and operation of various image sensor components.

In some examples, the controller 150 controls the column circuit 130 to convert analog signals from the array 110 to digital signals. The controller 150 may also control the column circuit 130 to output the digital signals via signal lines 160 to an output circuit for additional signal processing, storage, transmission, or the like. In some examples, the controller 150 includes a memory.

Additionally, the column circuit 130 may perform various signal processing methods as described in greater detail below. For example, one or more of the image processing circuits 132 may be controlled by the controller 150 to perform the various signal processing methods described below and output the processed signals as the digital signals via the signal lines 160 to an output circuit for additional signal processing, storage, transmission, or the like. In some examples, the controller 150 stores the various signal processing methods described below in the memory of the controller 150. In some examples, the memory of the controller 150 is a non-transitory computer-readable medium that includes computer readable code stored thereon for performing the various signal processing methods described below. Examples of a non-transitory computer-readable medium are described in greater detail below.

Alternatively, in some examples, image processing circuits (for example, one or more microprocessors, one or more digital signal processors, application specific integrated circuits (ASIC), field programmable gate arrays (FPGA), or other suitable processing devices) that are external to the image sensor 100 may receive the digital signals and perform the various signal processing methods as described below. Additionally or alternatively, the image processing circuits that are external to the image sensor 100 may retrieve the digital signals from the memory of the controller 150 that stores the digital signals and perform the various signal processing methods as described below. In some examples, the controller 150 may also include a processing device that performs the various signal processing method described below.

Figure 2:
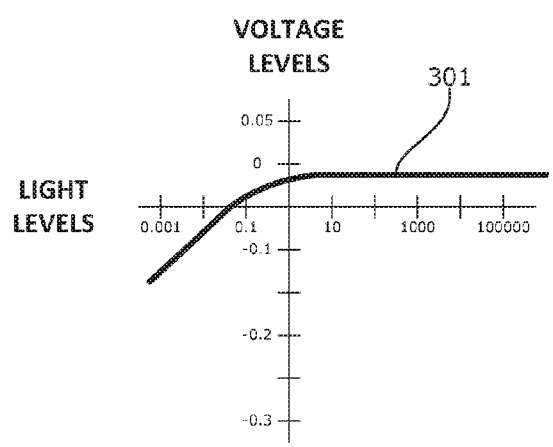
FIG. 2 illustrates an exemplary color filter array, in accordance with some aspects of the present disclosure.

The array 110 may be overlaid with a color filter array. FIG. 2 illustrates an exemplary color filter array 200, in accordance with some aspects of the present disclosure. In the example of FIG. 2, a portion of the color filter array 200 corresponds to a four by four section of the array 110, and in some examples, is tiled across the extent of the array 110 as described above.

In the color filter array 200, the various letters correspond to the primary colors red, green, and blue, and the case of the letter corresponds to one of a linear type pixel or a logarithmic type pixel. In the example of FIG. 2, and throughout the present disclosure, a lower case "r" represents a red color filter corresponding to a linear pixel or a red linear component value. An upper case "R" represents a red color filter corresponding to a logarithmic pixel or a red logarithmic component value. A lower case "g" represents a green color filter corresponding to a linear pixel or a green linear component value. An upper case "G" represents a green color filter corresponding to a logarithmic pixel or a green logarithmic component value. A lower case "b" represents a blue color filter corresponding to a linear pixel or a blue linear component value. An upper case "B" represents a blue color filter corresponding to a logarithmic pixel or a blue logarithmic component value. In other examples, the primary colors may include a RGBW (red, green, blue, and white) configuration, a CMY (cyan, magenta, yellow) configuration, a CYGM (cyan, yellow, green, magenta) configuration, or other suitable primary color configuration.

Each of the pixels 111 in the array 110 receives a particular wavelength range of incident light and converts the incident light to a pixel value that is read from each of the pixels 111 as raw data. To construct a color image from the sensor raw data for the purpose of viewing, storage, or display, an output image is generated such that each pixel of the output image comprises all color component values in a standard color space (for example, sRGB, YCbCr, XYZ, CMYK, or other suitable color space). That is, each output pixel in the output image may be represented by multiple color component values in the chosen color space. The process of converting an image from the sensor raw data (where each pixel is described by a single color component value depending on the array architecture) to a standard color image data (where each pixel is described by multiple color component values) is called demosaicing.

In the example illustrated in FIG. 2, linear pixels and logarithmic pixels are alternately arranged in both the row and column directions. With this configuration, the linear pixels and the logarithmic pixels of different primary colors are spread throughout the array 110 and both types of pixels and each primary color are located in any given section within the pixel array 110. Additionally, with this configuration, it is possible to take advantage of the different operating ranges of linear and logarithmic pixels.

[Combine Response and Color Processing]

Figure 3A:
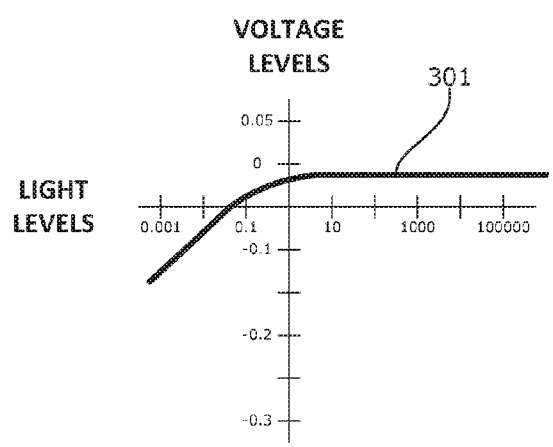
FIG. 3A illustrates the response of linear pixels to light, in accordance with some aspects of the present disclosure.
Figure 3B:
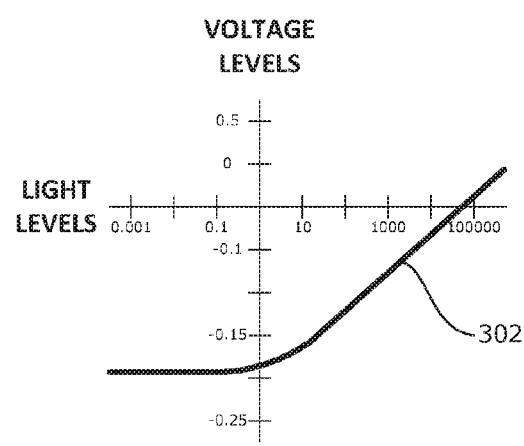
FIG. 3B illustrates the response of logarithmic pixels to light, in accordance with some aspects of the present disclosure.

In response to light, each of the pixels 111 produces a voltage response which represents the level of light incident upon each of the pixels 111. Given any fixed light level, one of the pixels 111 generates a specific voltage that depends on the pixel type (for example, linear or logarithmic) and the color. The range of normal operation for the linear pixels and the logarithmic pixels are different. That is, the range of light levels at which the output voltages from the linear pixels and the logarithmic pixels are not saturated (for example, not clipped) is different. For example, FIGS. 3A and 3B illustrate the response of linear pixels to light and the response of logarithmic pixels to light, respectively. In the example of FIG. 3A, the response is curve 301. In the example of FIG. 3B, the response is curve 302. Both curves 301 and 302 are plotted for a fixed time frame. In some examples, the fixed time frame is thirty frames per second (fps) or thirty-three milliseconds (msec). In the example of FIGS. 3A and 3B, the horizontal axes represent the light levels and are illustrated in logarithmic scale and the vertical axes represent photodiode voltage levels and are illustrated in linear scale.

In the example of FIG. 3A, the light response curve 301 illustrates that the linear pixels operate effectively below a certain light level (for example, a threshold light level of two lux and lower). Accordingly, when the light level is below the threshold light level the linear pixels produce voltages that vary with the incoming light level, and when the light level is above the threshold light level the linear pixels clip and the output voltage changes little with respect to further increases in the incoming light level.

By comparison, in the example of FIG. 3B, the light response curve 302 illustrates that the logarithmic pixels operate effectively above a certain light level that is different than the certain light level of the linear pixels (for example, a threshold light level of 0.1 lux and higher). Accordingly, when the light level is above a threshold the logarithmic pixels produce voltages that vary with the incoming light level, and when the light level is below the threshold the logarithmic pixels clip and the output voltage changes little with respect to further decreases in the incoming light level.

Referring back to FIG. 2, when the two types of pixels are included together, it is possible to capture useful signals with a wider dynamic range by utilizing the linear pixels at low light levels and the logarithmic pixels at high light levels. To form such image data and construct a useful color output image, the two different responses (for example, the linear pixel values and the logarithmic pixel values) may be combined together in such a way that the combined response (for example, the combined pixel values) gives increasing output with increasing light levels and is continuous. In other words, the combined pixel values have monotonicity and continuity.

In the color sensor array 200, summing of the linear and logarithmic responses may be done for each of the red, green and blue color channels. When the light responses 301 and 302 in FIGS. 3A and 3B, respectively, are summed to give FIG. 6 as described in greater detail below, the summing procedure considers the values in the saturated regions of the light responses 301 and 302 in FIGS. 3A and 3B as valid signal values.

For example, with respect to a monochrome image sensor, when two pixel values may be determined for a given pixel location, where the first pixel value corresponds to the output of a physically linear pixel (for example, a "linear pixel value"), and the second pixel value corresponds to the output of a physically logarithmic pixel (for example, a "logarithmic pixel value"), then the two pixel values may be summed similar to the procedure of adding the light responses in FIGS. 3A and 3B to form a combined pixel value. That is, a linear pixel value and a logarithmic pixel value may be determined for and associated with a given pixel in the array of pixels, then the two pixel values associated with the given pixel may be summed to form a combined pixel value. The combined pixel value associated with the given pixel in the array of pixels may be used to generate an output image having combined pixels. The output image having combined pixels is as if the output image is captured by an image sensor having a light response with monotonicity and continuity. The linear pixel value associated with the given pixel in the array of pixels may be obtained either directly from the pixel output of the corresponding pixel when the corresponding pixel is a linear pixel or by spatial interpolation from neighboring linear pixel values when the corresponding pixel is a logarithmic pixel. Similarly, the logarithmic pixel value for the given pixel in the array of pixels may be obtained either directly from the pixel output of the corresponding pixel when the corresponding pixel is a logarithmic pixel or by spatial interpolation from neighboring logarithmic pixel values when the corresponding pixel is a linear pixel.

The method described above may also be applied to a color image sensor having linear pixels and logarithmic pixels (for example, the image sensor 100 as described above). Specifically, the method includes determining a linear rgb value (i.e., a linear red value, a linear green value, and a linear blue value) and a logarithmic RGB value (i.e., a logarithmic red value, a logarithmic green value, and a logarithmic blue value) for a given pixel of the pixels 111 in the array 110. The linear rgb values correspond to a linear sensor and the logarithmic RGB values correspond to a logarithmic sensor. The summing method as described above is used independently on each color plane to produce an output color image. In other words, the linear r value is added to the logarithmic R value to produce the output red value, the linear g value is added to the logarithmic G value to produce the output green value, and the linear b value is added to the logarithmic B value to produce the output blue value. To determine a linear rgb value and a logarithmic RGB value associated with a given pixel of the pixels 111 in the array 110, separate spatial interpolation (demosaicing) procedures are performed. For example, to determine the linear rgb value associated with the given pixel of the pixels 111 in the array 110, a spatial interpolation procedure is performed using the linear pixel values read from the linear pixels of the pixels 111 in the array 110. Similarly, to determine the logarithmic RGB value associated with the given pixel of the pixels 111 in the array 110, a second spatial interpolation procedure is performed using the logarithmic pixel values read from the logarithmic pixels of the pixels 111 in the array 110.

Figure 4:
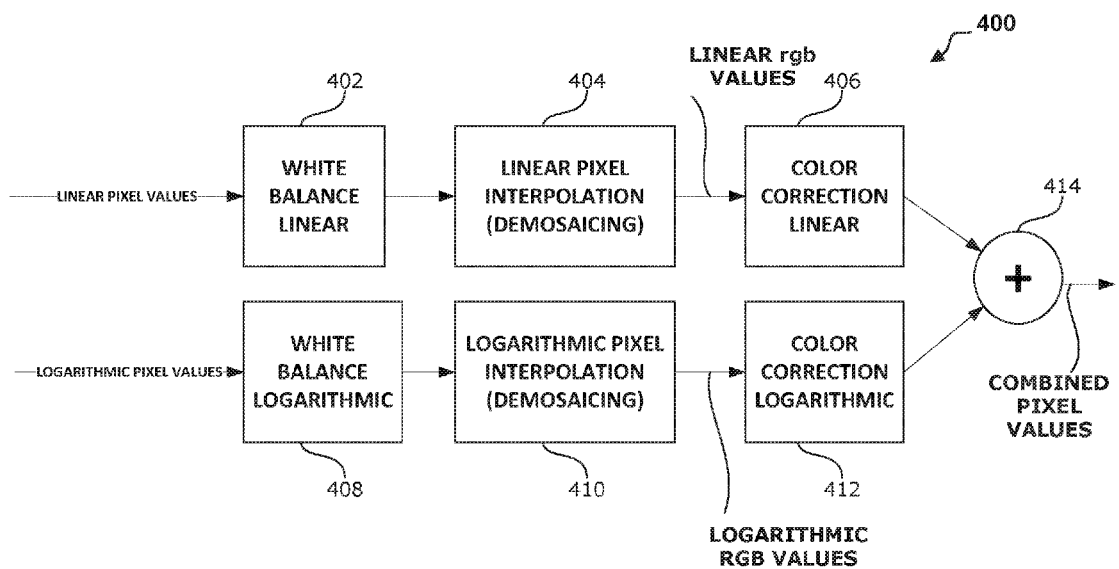
FIG. 4 illustrates an exemplary method for use with an array of pixels having both linear and logarithmic pixels, in accordance with some aspects of the present disclosure.

FIG. 4 illustrates an exemplary method for use with a color filter array having both linear and logarithmic pixels. In the example of FIG. 4, the linear pixel values from the linear pixels are processed by white balancing (at block 402), demosaicing (at block 404), and color correcting (at block 406) to produce the linear rgb value associated with a given pixel in array of pixels as described above. Similarly, in the example of FIG. 4, the logarithmic pixel values from the logarithmic pixels are processed by white balancing (at block 408), demosaicing (at block 410), and color correcting (at block 412) to produce the logarithmic RGB value associated with the given pixel in the array of pixels as described above.

In some examples, white balancing (at blocks 402 and 408) the linear pixel values and the logarithmic pixel values is optional. In these examples, the linear pixel values and the logarithmic pixel values may be interpolated (at blocks 404 and 410) with or without white balancing (at blocks 402 and 408).

In other examples, color correcting (at blocks 406 and 412) the linear rgb values and the logarithmic RGB values is optional. In these examples, the linear rgb values and the logarithmic RGB values may be output (at blocks 404 and 410) and combined (at summing operator 414) with or without color correction (at blocks 406 and 412).

In yet other examples, white balancing (at blocks 402 and 408) the linear pixel values and the logarithmic pixel values and color correcting (at blocks 406 and 412) the linear rgb values and the logarithmic RGB values are both optional. In these examples, the linear pixel values and the logarithmic pixel values may be interpolated (at blocks 404 and 410) with or without white balancing (at blocks 402 and 408) and the linear rgb values and the logarithmic RGB values may be output (at blocks 404 and 410) and combined (at summing operator 414) with or without color correction (at blocks 406 and 412).

The linear pixels and the logarithmic pixels have very different responses to color. Accordingly, the white balancing (at blocks 402 and 408) and the color correcting (at blocks 406 and 412) for the linear pixels and the logarithmic pixels are also different. For example, the white balancing (at block 402) of the linear pixel values may be implemented using a multiplication step where the r, g, and b values are multiplied by color dependent gain values. In a practical system, the color dependent gain values are typically determined by a calibration process, which depends on the color temperature of the illuminant. For logarithmic pixels, the white balancing of the logarithmic RGB values (at block 408) may be implemented using an additional step where the R, G, and B values are shifted by color dependent offset values. In some examples, the color dependent offset values are found by a calibration process that depends on the color temperature of the illuminant.

In some examples, the color correction of the linear rgb values (at block 406) may be performed using a color matrix method. In other words, the color correction of the linear rgb values (at block 406) may be implemented by having the rgb input colors associated with a linear pixel multiplied by a three by three color matrix to produce the output rgb colors as described in the following expression (1). The matrix coefficients a00 . . . a22 may be determined for each color temperature using a calibration method.

$$\begin{bmatrix} r_{out} \\ g_{out} \\ b_{out} \end{bmatrix} = \begin{bmatrix} a_{00} & a_{01} & a_{02} \\ a_{10} & a_{11} & a_{12} \\ a_{20} & a_{21} & a_{22} \end{bmatrix} \begin{bmatrix} r_{in} \\ g_{in} \\ b_{in} \end{bmatrix} \quad (1)$$

Color correction for the logarithmic pixels is more complicated because the color matrix correction method only works well for signals that are linear. A logarithmic pixel is, by definition, non-linear. To overcome the complexity, the color correction of the logarithmic RGB values (at block 412) may be implemented by incorporating a color correction procedure.

Figure 5:
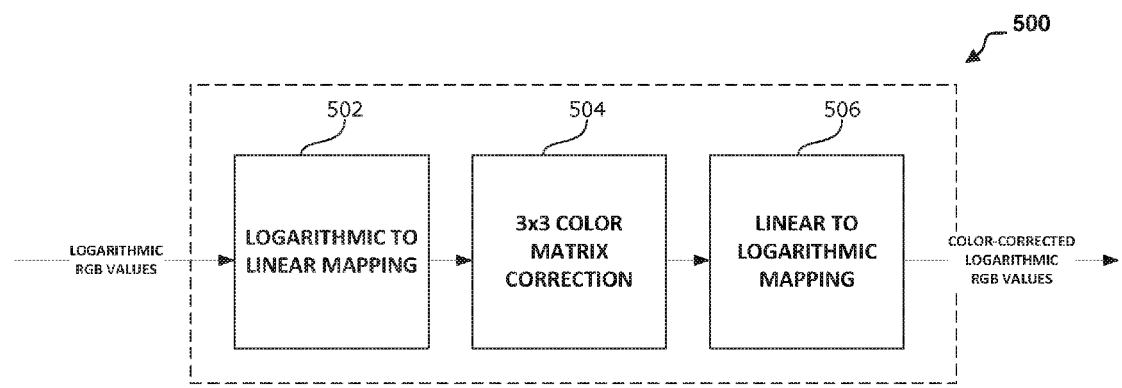
FIG. 5 illustrates an exemplary color correction procedure for use with logarithmic pixels, in accordance with some aspects of the present disclosure.

FIG. 5 illustrates an exemplary color correction procedure 500 for use with logarithmic pixels. In the example of FIG. 5, the color correction procedure 500 includes mapping the logarithmic response to a linear response (for example, the logarithmic RGB values are linearly mapped) to generate a linear-mapped response (at block 502). After mapping the logarithmic response to the linear response, the color correction procedure 500 includes applying a three by three color matrix correction as described above (at block 504) to the linear-mapped response to generate a color-corrected and linear-mapped response (for example, color-corrected and linear-mapped values). After applying the three by three color correction matrix to the mapped linear response, the color correction procedure 500 includes mapping the color-corrected and linear-mapped response back to the logarithmic space (at block 506) to result in a color-corrected logarithmic response (for example, color-corrected logarithmic RGB values).

Referring back to FIG. 4, after color correcting the linear rgb values and the logarithmic RGB values (at blocks 406 and 412), the color-corrected linear rgb values are combined with the corresponding color-corrected logarithmic RGB values (at summing operator 414) to generate and output combined pixel values. Each of the combined pixel values is associated with one pixel in the array of pixels.

Figure 6:
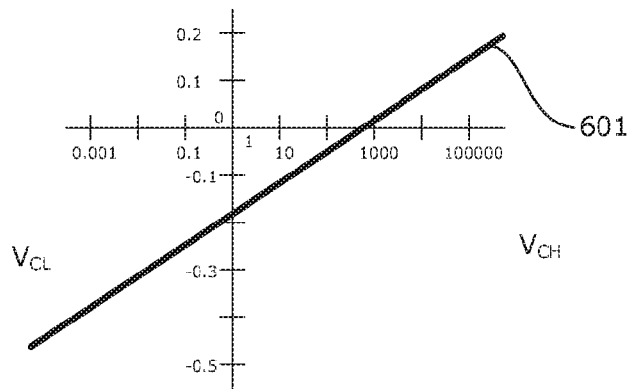
FIG. 6 illustrates the result of summing the response of the linear pixels and the response of the logarithmic pixels to produce a combined response, in accordance with some aspects of the present disclosure.

FIG. 6 illustrates the result of summing the light response of the linear pixels and the light response of the logarithmic pixels to produce a combined light response 601 (for example, the combined pixel values as described above). The two different light responses are combined together and the combined light response 601 has monotonicity and continuity. Each of the light responses, individually, is monotonic and continuous after the processing described above, and therefore, the summed combined light response is also monotonic and continuous. In the example of FIG. 6, the overall operating range of the image sensor (for example, image sensor 100) ranges from about 0.001 lux to 10000 lux (for example, the dynamic range of the combined response spans about 140 dB).

[Adaptive Demosaicing]

As described above, the linear rgb values may be determined by interpolation using the available linear pixel values, and the logarithmic RGB values may be determined by interpolation using the available logarithmic pixel values. The following is a description of the interpolation of the linear pixel values to determine the linear rgb values. When using a color filter array (for example, the color filter array 200), the missing values include the two color components that are missing in a physical linear pixel location (for example, the missing blue "b" and green "g" values in a pixel location with a physical red "r" color pixel) and the three color components in a physical logarithmic pixel location (for example, the missing red "r," blue "b," and green "g" color components). Similarly, the missing values for the interpolation of logarithmic pixel values to determine the logarithmic RGB values include the two color components that are missing in a physical logarithmic pixel location (for example, the missing blue "B" and green "G" values in a pixel location with a physical red "R" color pixel), and the three color components in a physical linear pixel location (for example, the missing red "R," blue "B," and green "G" color components). Accordingly, a demosaic method to determine the pixel values from an image sensor having both the linear type and logarithmic type pixels (for example, the image sensor 100) is more complicated than a demosaic method to determine the pixel values from an image sensor having a single pixel type array.

Adaptive demosaic algorithms take the structural information of an image into account. As described above, a method is used to process the linear pixels and the logarithmic pixels separately. The approaches to demosaicing to determine the linear rgb values and logarithmic RGB values are similar. In the following description, details of the interpolation for the linear rgb values using the linear pixel values is described. However, interpolation of the logarithmic RGB values may follow a similar process with suitable reference to the logarithmic pixel values.

Adaptive demosaic algorithms estimate the edges in an image and perform interpolation in the direction that preserves the edges in the image. The proportion of green pixels in a color filter array (CFA) is typically higher than red and blue pixels, and the green color plane may be interpolated first. Accordingly, the raw data from the linear pixels is used to estimate the gradient, and interpolation for the green plane is performed while taking the edges into account. After interpolating the green color plane, the red and blue color planes are interpolated. To interpolate the red and blue color planes, the interpolated green color plane, rather than the raw data, may be used to estimate the gradient information. Using the interpolated green plane to estimate edge information in this step is advantageous because the green plane has already been fully interpolated. Alternatively, determination of gradient information from the interpolated green plane can be skipped and interpolation of the red and blue planes may be performed using the raw pixels while taking into account the estimated edge information that was used to interpolate the green plane.

Figure 7:
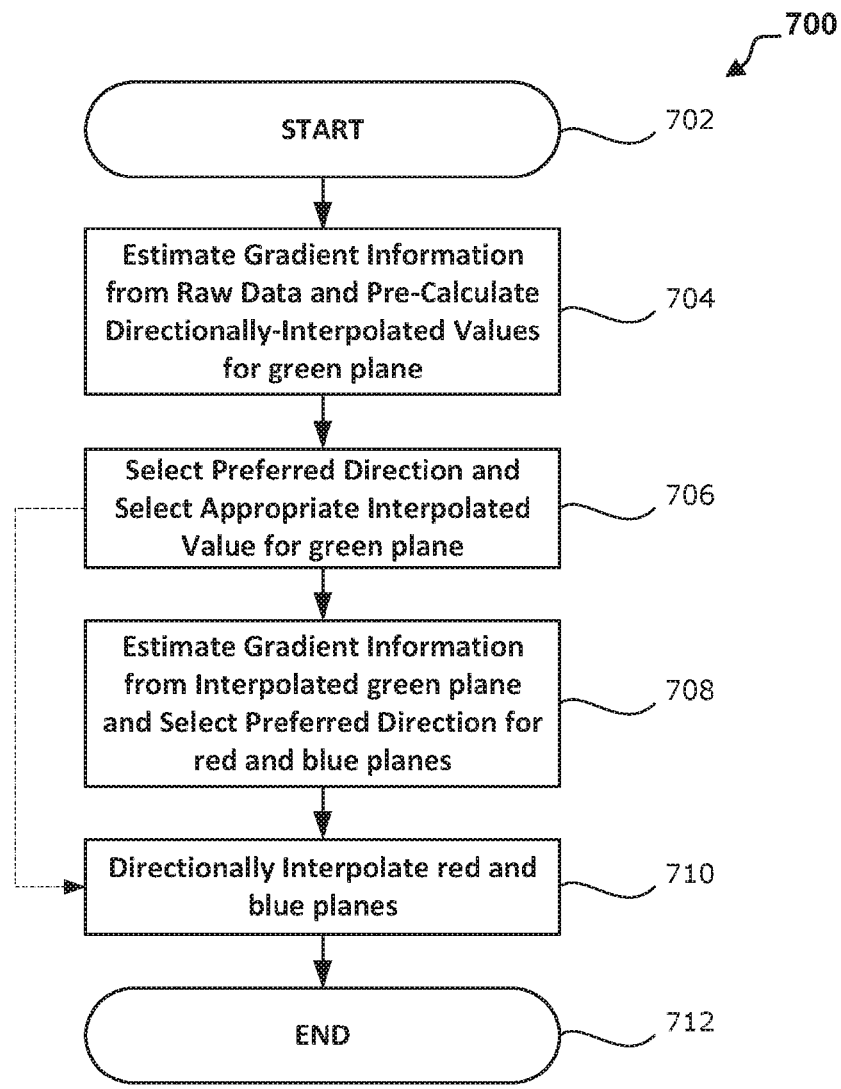
FIG. 7 illustrates an exemplary process flow for an adaptive demosaic algorithm to determine linear rgb values from an image sensor having both linear and logarithmic pixels.

FIG. 7 illustrates an exemplary process flow for an adaptive demosaic algorithm 700 to determine linear rgb values from an image sensor having both linear and logarithmic pixels. The adaptive demosaic algorithm 700 may be stored in a non-transitory computer-readable medium and implemented in a column circuit within an image sensor (for example, column circuit 130 within the image sensor 100 as described above) or in processing by image processing circuits (for example, internal or external image processing circuits as described above) that occurs after the image data has been captured. Stated differently, the adaptive demosaic algorithm 700 may be performed by a processing device that is internal or external with respect to the image sensor 100 as described above. The processing device may be may be comprised of one or more generic or specialized processors (or "processing devices") such as microprocessors, digital signal processors, customized processors, application specific integrated circuits (ASIC) and field programmable gate arrays (FPGAs) and unique stored program instructions (including both software and firmware) that control the one or more processors to implement, in conjunction with certain non-processor circuits, some, most, or all of the functions of the method and/or apparatus described herein. The non-transitory computer-readable medium includes computer readable code stored thereon for programming a computer (e.g., comprising a processor) to perform a method as described and claimed herein. Examples of a non-transitory computer-readable medium include a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and any other suitable non-transitory computer-readable medium.

The adaptive demosaic algorithm 700 is initialized at operation 702. After initialization, at operation 704, the gradient information is estimated from the raw data for the g (green) plane, and directionally-interpolated data values are calculated. These values are compared at operation 706, whereby a preferred gradient direction and an appropriate interpolated g plane value are selected. Subsequently, at operation 708, preferred directions for r (red) and b (blue) planes are selected based on an estimated gradient information from the interpolated g plane. At operation 710, the r and b planes are directionally interpolated. At operation 712, the adaptive demosaic algorithm 700 terminates. Each of the operations 704-710 are described in greater detail below.

Alternatively, operation 708 may be skipped. In this case, the preferred directions determined in operation 706 for each pixel may be used in operation 710 to interpolate the r and b planes directionally.

Figure 8:
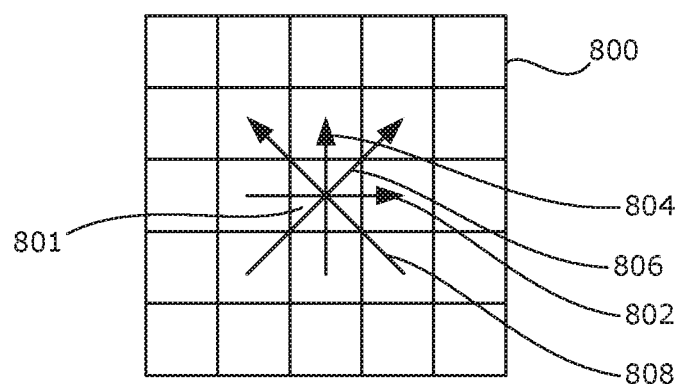
FIG. 8 illustrates an exemplary five by five array of pixels and the four directions used in gradient estimation and directional interpolation for adaptive demosaicing.

With respect to operation 704 of FIG. 7, the gradient information along four directions is estimated for a given pixel. FIG. 8 illustrates an exemplary five by five array of pixels 800 and the four directions used in gradient estimation and directional interpolation for adaptive demosaicing. In the example of FIG. 8, the four directions are a horizontal direction 802, a vertical direction 804, a slash direction 806, and a backslash direction 808. Additionally, as illustrated in FIG. 8, the gradient may be estimated using, for example, a five by five neighborhood of raw pixel values centered at the pixel where the gradient information is estimated.

Figure 9:
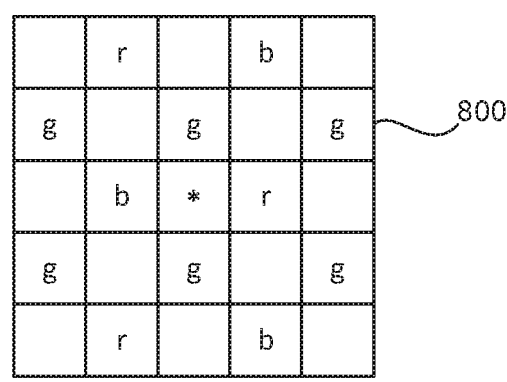
FIG. 9 illustrates an exemplary subset of the five by five array of pixels of FIG. 8 in which the linear green component value associated with the output pixel is determined, in accordance with some aspects of the present disclosure.

Due to the pattern of the color filter array, the particular calculations of the gradient information and the directional interpolation differ based on the location of the pixel. FIG. 9 illustrates an exemplary subset of the five by five array of pixels 800 of FIG. 8 in which the linear green component value "g" associated with the output pixel is to be determined. In the example of FIG. 9, only the linear pixels are labelled in the five by five array of pixels 800. The pixel to be interpolated is marked by an asterisk ("*") which corresponds to a position of a logarithmic pixel circuit.

A raw pixel y(i,j) is identified by the coordinates (i,j) where i is the row index and j is the column index, and y can be r, g, b, R, G or B. Using the convention where i and j run from 0 to 4 for row and column, the upper-left pixel is referred to as x(0,0); the central pixel 801 is referred to as x(2,2); and the lower-right pixel is referred to as x(4,4). In the example of FIG. 9, the green component value "g" for the middle pixel (2,2) is to be determined by first estimating the gradient at the vertical, horizontal, slash and backslash directions. The following shows an example of the gradient information estimation and directional interpolation calculations.

Figure 10:
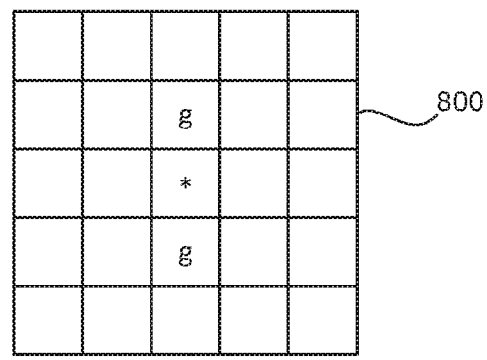
FIG. 10 illustrates an exemplary subset of the five by five array of pixels of FIG. 8 used in estimating a gradient strength and directional interpolated result in the vertical direction.

FIG. 10 illustrates an exemplary subset of the five by five array of pixels 800 of FIG. 8 used in estimating a gradient strength and directional interpolated result in the vertical direction. As illustrated in FIG. 10, the asterisk "*" represents the pixel where the green value is to be computed. The vertical gradient may calculated according to the following expressions (2) and (3).

$$dv=4*|g(1,2)-g(3,2)| \quad (2)$$

$$avgv=(g(1,2)+g(3,2))/2 \quad (3)$$

In the expressions above, dv is the vertical gradient strength and avgv is the interpolated value using vertical interpolation. The value dv may also be used to determine the preferred interpolation direction. The value avgv represents the vertically interpolated value for the green plane. In some examples, when the vertical direction determined later is the preferred direction, then the interpolation output (for example, the green color plane value for the pixel (2,2)) is set to avgv.

To compare the gradient strengths of various directions against each other, the gradient strength is normalized to allow for a meaningful comparison. In the first case above, the vertical gradient strength is calculated by expression (2), which represents a coordinate distance of two pixels multiplied by a factor of four. That is, the vertical gradient strength corresponds to a coordinate distance of eight pixels. Gradient strength calculations in the other directions are also "normalized" similarly so that gradient strengths of different directions can be meaningfully compared.

Figure 11A:
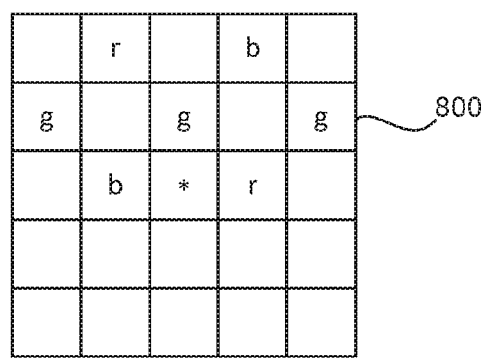
FIGS. 11A and 11B illustrate exemplary subsets of the five by five array of pixels of FIG. 8 used in estimating a gradient strength and directional interpolated result in the horizontal direction.
Figure 11B:
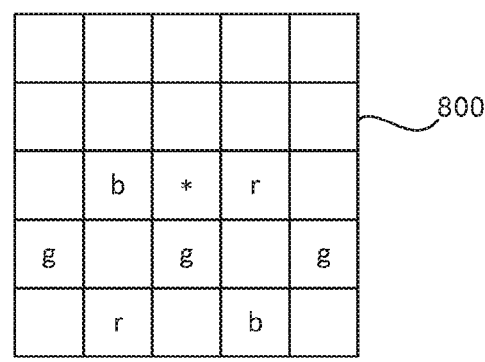

FIGS. 11A and 11B illustrate exemplary subsets of the five by five array of pixels 800 of FIG. 8 used in estimating a gradient strength and directional interpolated result in the horizontal direction. In the examples of FIGS. 11A and 11B, the interpolation procedure is more complex than vertical gradient estimation as described above with respect to FIG. 10. The linear green pixels at the locations (1,0), (1,2), (1,4), (3,0), (3,2) and (3,4) are used for interpolating in the horizontal direction. These pixels are separated into two groups. The first group "north" comprises the pixels at the locations (1,0), (1,2) and (1,4) and is illustrated in FIG. 11A. The second group "south" comprises the pixels at the locations (3,0), (3,2) and (3,4) and is illustrated in FIG. 11B.

In the example of FIG. 11A, the first group also include the linear pixels r(0,1), b(0,3), b(2,1), and r(2,3). In the example of FIG. 11B, the second group also include the linear pixels b(2,1), r(2,3), r(4,1), and b(4,3). Two parameters dn and ds are calculated from the r and b pixels according to the following expressions (4) and (5).

$$dn=|b(2,1)+r(2,3)-r(0,1)-b(0,3)| \quad (4)$$

$$ds=|b(2,1)+r(2,3)-r(4,1)-b(4,3)| \quad (5)$$

These parameters, calculated from the r and b pixels, are used to determine whether the values in the middle row (row 2) are closer to those of the north row (row 0) or to the south row (row 4). When the middle row is closer to the north row, then the green linear pixels of the "north" group are used for horizontal interpolation. Alternatively, when the middle row is closer to the south row, then the green linear pixels of the "south" group are used for horizontal interpolation. In this decision, a small quantity "thres" (for example, one percent of the full range $2^b$) is used to ensure that the selection of the "north" group or the "south" group is not ambiguous.

For example, when the "north" group is used for horizontal interpolation, i.e. "when (dn<(ds−thres))," the specific interpolation step uses an "estimate and adjust" approach. The gradient strength is calculated according to expression (6) and a first estimate of the horizontally interpolated result is given according to expression (7).

$$dh=2*|g(1,0)-g(1,2)|+2*|g(1,2)-g(1,4)| \quad (6)$$

$$avgh=(g(1,0)+2*g(1,2)+g(1,4))/4 \quad (7)$$

In other words, the first estimate is a horizontal interpolation using the 3 green (g) pixels in row 1 of FIG. 11A, which is one row above the output pixel location of (2,2). To account for a possible slope in the image in the vertical direction, an adjustment is made to improve the estimate. To make such compensation, an estimate of the vertical slope is calculated using the r and b pixels in row 0 and row 2 according to expression (8).

$$delta\_rb = \frac{1}{2}\left(\frac{b(2,1)+r(2,3)}{2} - \frac{r(0,1)+b(0,3)}{2}\right) \quad (8)$$

The term (b(2,1)+r(2,3))/2 is the average of the values in row 2, and the term (r(0,1)+b(0,3))/2 is the average of the values in row 0. Accordingly, delta_rb represents one half of the difference between row 2 and row 0, which may be used as an estimate for the difference between row 2 and row 1. The adjustment value delta_rb is added to avgh to give the value of horizontal interpolation according to expression (9).

$$avgh=avgh+delta\_rb \quad (9)$$

The expression (9) defines the "estimate and adjust" method. In other examples, when the "south" group is selected for horizontal interpolation, i.e. "when (ds<(dn−thres))," a similar calculation is performed according to expressions (10)-(12) and expression (9).

$$dh=2*|g(3,0)-g(3,2)|+2*|g(3,2)-g(3,4)| \quad (10)$$

$$avgh=(g(3,0)+2*g(3,2)+g(3,4))/4 \quad (11)$$

$$delta\_rb=(b(2,1)+r(2,3)-r(4,1)-b(4,3))/4 \quad (12)$$

$$avgh=avgh+delta\_rb \quad (9)$$

In these examples, the pixels as shown in FIG. 11B, which comprise rows 2, 3 and 4 of FIG. 8, are used for horizontal interpolation. Similarly, the estimate and adjust method defined by expression (9) is used, and only the pixels used for interpolation are labelled in FIG. 11B.

In yet other examples, when neither the "north" group nor the "south" group is significantly lower, then the gradient strength is calculated according to expression (13) and the output is calculated from an average of the 6 green pixels at (1,0), (1,2), (1,4), (3,0), (3,2), and (3,4) according to expression (14).

$$dh=|g(1,0)-g(1,2)|+|g(1,2)-g(1,4)|+|g(3,0)-g(3,2)|+ \\ |g(3,2)-g(3,4)| \quad (13)$$

$$avgh=(g(1,0)+2*g(1,2)+g(1,4)+g(3,0)+2*g(3,2)+g(3,4))/8 \quad (14)$$

Similar to the vertical gradient calculation, the value avgh is used as the output value for the green plane when the horizontal direction is determined to be the preferred direction.

Figure 12:
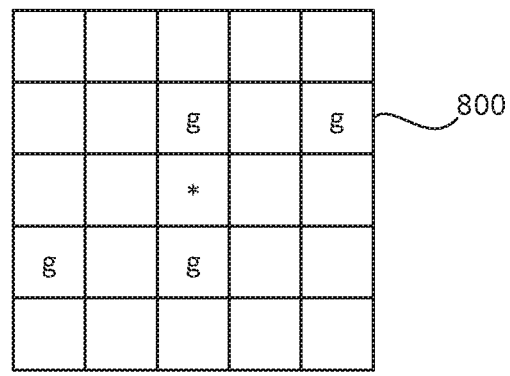
FIG. 12 illustrates an exemplary subset of the five by five array of pixels of FIG. 8 used in estimating a gradient strength and directional interpolated result in the slash direction.

FIG. 12 illustrates an exemplary subset of the five by five array of pixels 800 of FIG. 8 used in estimating a gradient strength and directional interpolated result in the slash direction. In the example of FIG. 12, the gradient estimation for the slash direction may be estimated by the subset of pixels in FIG. 12 according to expression (15) and the interpolated value in the slash direction is given according to expression (16). Additionally, when the preferred direction is the slash direction, then the value of the green plane for the output pixel is set to avgsl.

$$dsl=2*|g(1,2)g(3,0)|+2*|g(1,4)g(3,2)| \quad (15)$$

$$avgsl=(3*g(1,2)+g(3,0)+g(1,4)+3*g(3,2))/8 \quad (16)$$

Figure 13:
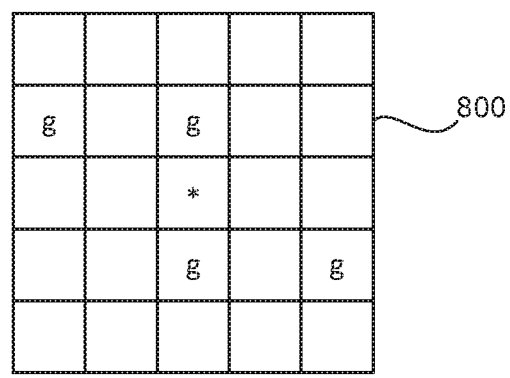
FIG. 13 illustrates an exemplary subset of the five by five array of pixels of FIG. 8 used in estimating a gradient strength and directional interpolated result in the backslash direction.

FIG. 13 illustrates an exemplary subset of the five by five array of pixels 800 of FIG. 8 used in estimating a gradient strength and directional interpolated result in the backslash direction. In the example of FIG. 13, the gradient estimation for the backslash direction may be estimated by the subset of pixels in FIG. 13 according to expression (17) and the interpolated value in the backslash direction is given according to expression (18). Additionally, when the preferred direction is the backslash direction, then the value of the green plane for the output pixel is set to avgbs.

$$dbs=2*|g(1,0)-g(3,2)|+2*|g(1,2)-g(3,4)| \quad (17)$$

$$\text{avg}bs=(g(1,0)+3*g(3,2)+3*g(1,2)+g(3,4))/8 \quad (18)$$

In the description above, a method for the calculation of the gradient strength and directionally interpolated value are provided for the pixel configuration in FIG. 8. There are a number of other possible pixel configurations for which interpolation may be used.

Figure 14:
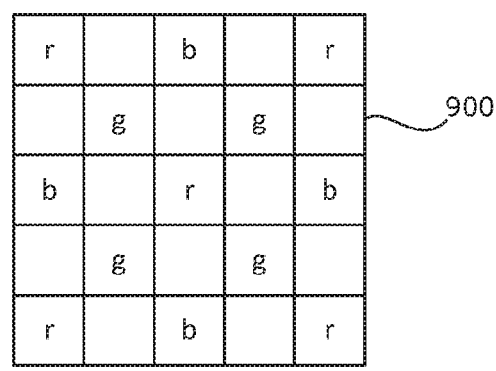
FIG. 14 illustrates another five by five array of pixels for determining the green component value associated with the output pixel, in accordance with various aspects of the present disclosure.

FIG. 14 illustrates another exemplary five by five array of pixels 900 for determining the green component value "g" associated with the output pixel, in accordance with various aspects of the present disclosure. In contrast with the exemplary pixel configuration of FIG. 8, the example of FIG. 14 shows a pixel configuration where the center pixel at position (2,2) is a red linear pixel. Accordingly, the computation of a green component value "g" for the red linear pixel at (2,2) is performed by interpolation as described in greater detail below.

Figure 15A:
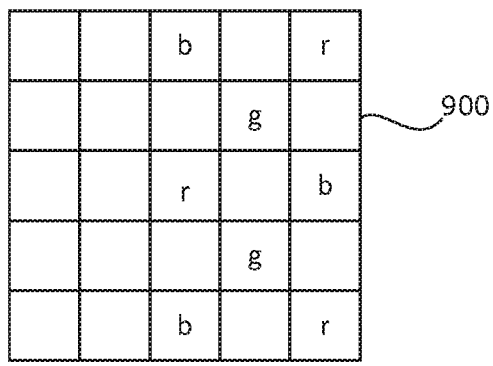
FIGS. 15A and 15B illustrate exemplary subsets of the five by five array of pixels of FIG. 14 used in estimating a gradient strength and directional interpolated result in the vertical direction.
Figure 15B:
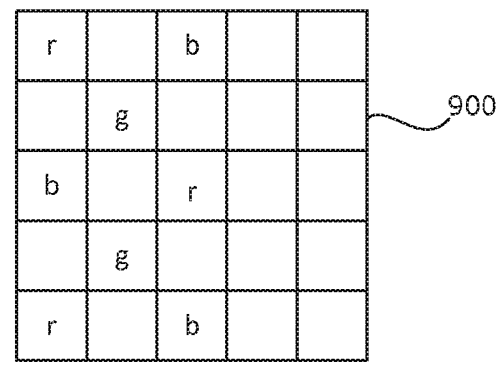

FIGS. 15A and 15B illustrate subsets of the five by five array of pixels 900 of FIG. 14 used in estimating a gradient strength and directional interpolated result in the vertical direction. To estimate the vertical gradient for the pixel position (2,2) in FIG. 14, the quantities de and dw are calculated according to expressions (19) and (20) and used to determine whether the east "right" side or the west "left" side may be used for interpolation.

$$de=|2*r(2,2)-r(0,4)-(4,4)|+|2*b(2,4)-b(0,2)-b(4,2)| \quad (19)$$

$$dw=|2*r(2,2)-r(0,0)-(4,0)|+|2*b(2,0)-b(0,2)-b(4,2)| \quad (20)$$

When de<(dw−thres) for a predetermined constant thres, then the configuration of pixels illustrated in FIG. 15A is used to calculate an interpolated value according to expressions (21)-(24).

$$dv=2*|g(1,3)-g(3,3)| \quad (21)$$

$$\text{avg}v=(g(1,3)+g(3,3))/2 \quad (22)$$

$$\text{delta\_}rb=(r(2,2)-(r(0,4)+r(4,4))/2)/2 \quad (23)$$

$$\text{avg}v=\text{avg}v+\text{delta\_}rb \quad (24)$$

In other examples, when dw<(de−thres), then the configuration of pixels illustrated in FIG. 15B is used to calculate an interpolated value according to expressions (24)-(27) and expression (24).

$$dv=2*|g(1,1)-g(3,1)| \quad (25)$$

$$\text{avg}v=(g(1,1)+g(3,1))/2 \quad (26)$$

$$\text{delta\_}rb=(r(2,2)-(r(0,0)+r(4,0))/2)/2 \quad (27)$$

$$\text{avg}v=\text{avg}v+\text{delta\_}rb \quad (24)$$

In yet other examples, when de and dw are not significantly different than the other, then the gradient strength is calculated according to expression (28) and the output is calculated from an average of the four green pixels at (1,1), (3,1), (1,3), and (3,3) according to expression (29).

$$dv=|g(1,1)-g(3,1)|+|g(1,3)-g(3,3)| \quad (28)$$

$$\text{avg}v=(g(1,1)+g(3,1)+g(1,3)+g(3,3))/4 \quad (29)$$

Figures 16A, 16B, 17:
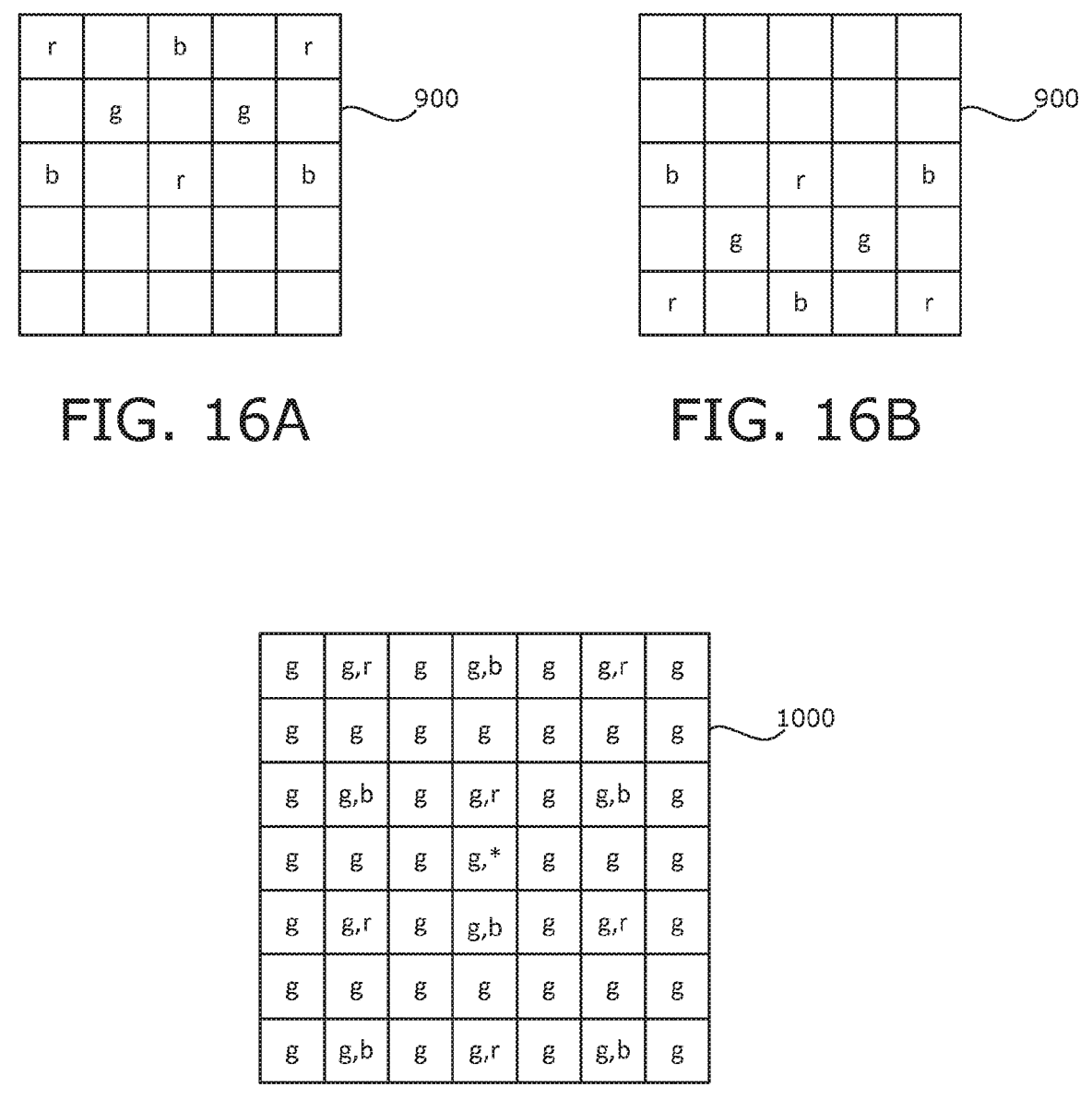

FIGS. 16A and 16B illustrate subsets of the five by five array of pixels 900 of FIG. 14 used in estimating a gradient strength and directional interpolated result in the horizontal direction. The horizontal gradient and the corresponding interpolated value is calculated from the configurations of pixels shown in FIGS. 16A and 16B. The configuration of pixels shown in FIGS. 16A and 16B is very similar to those in FIGS. 15A and 15B, except that the patterns are rotated by 90 degrees. Accordingly, the calculations for the horizontal gradient strength and the directional interpolated result are also very similar to the vertical gradient and interpolated value calculations described above, except that the pixel locations correspond to the rotated configuration of pixels shown in FIGS. 16A and 16B.

Additionally, in some examples, the slash gradient and interpolated values of the five by five array of pixels 900 may be calculated according to expressions (30) and (31). Similarly, in some examples, the backslash gradient and interpolated values may be calculated according to expressions (32) and (33).

$$dsl=|2*(g(1,3)-g(3,1)| \quad (30)$$

$$\text{avg}sl=(g(1,3)+g(3,1))/2 \quad (31)$$

$$dbs=|2*(g(1,1)-g(3,3)| \quad (32)$$

$$\text{avg}bs=(g(1,1)+g(3,3))/2 \quad (33)$$

With respect to operation 706 of FIG. 7, the strengths (for example, the absolute value) of the gradients in the four directions are compared to each other. A strong gradient in a particular direction indicates that there is a strong edge perpendicular to that direction. For example, a strong vertical gradient suggests that there is potentially a strong horizontal edge, and as a result interpolation in the vertical direction is not the preferred direction. After comparing the gradient strengths that are defined within the four directions, a determination whether there is a direction having a gradient strength significantly lower than the gradient strength in the other directions is performed. In some examples, "significantly lower" is defined by a gradient strength that is lower than the other gradient strengths by more than a pre-determined constant delta δ. For example, delta δ may be chosen as a percentage of the lowest gradient strength value, a percentage of the local average pixel value, a percentage of the maximum value according to the bit depth, or other suitable percentage.

In some examples, when the determination indicates there is a direction with a significantly lower gradient strength than the other directions, the direction with the significantly lower gradient strength may be considered the preferred direction for directional interpolation for the particular pixel. Accordingly, interpolation for the pixel is advantageously performed in the preferred direction. In other examples, when the determination does not indicate there is a direction with a significantly lower gradient strength than the other directions, then interpolation is performed in a non-directional manner.

With respect to operation 708 of FIG. 7, the green plane has been interpolated according to the above expressions. In other words, there is a green component value "g" for each pixel location which is denser than the other color planes (i.e. red and blue planes) in the raw image before interpolation. Accordingly, the interpolated green plane, in some examples, may be used to estimate gradient information for the purpose of interpolating the red and blue planes. Alternatively, the raw data may be used to estimate gradient information for the purpose of interpolating the red and blue planes similar to the description above with respect to interpolating the green plane.

In some embodiments, a five by five array of pixels are used for estimating the gradient information in operation 708. Since the interpolated green plane is fully populated, any method for calculating gradients may be used in this calculation. Accordingly, the specific calculations of gradient estimation are not further described. The gradient strengths are similarly given by the absolute value of the gradients.

After the gradient strengths in the vertical, horizontal, slash, and backslash directions are estimated for the given pixel, a determination is performed to determine one of the four directions which has a gradient strength significantly lower than the other directions. In some examples, when the determination indicates there is a direction with a gradient strength significantly lower than the other directions, the direction with the lowest gradient strength is selected and designated as the preferred direction for interpolation. In other examples, when the determination does not indicate there is a direction with a gradient strength significantly lower than the other directions, a preferred direction is not assigned and interpolation is performed in a non-directional manner. Alternatively, operation 708 may be skipped and the preferred directions selected in operation 706 may be used for the purpose of interpolating the red and blue planes.

With respect to the operation 710 of FIG. 7, when there is a preferred direction, directional interpolations for the red and blue plane may be performed based on the preferred direction for a given pixel location. In some examples, a seven by seven array of pixels is used for interpolation. FIG. 17 illustrates an exemplary seven by seven array of pixels 1000 for determining the red and blue component values associated with the output pixel. In the example of FIG. 17, the values for the red and blue color planes "r" and "b" for pixel location (3,3) of the output pixel are found by interpolation. As described above, the linear green pixels values "g" are available for all pixel locations. The linear pixel values that are available for interpolation in the seven by seven array of pixels 1000 are labelled in FIG. 17.

To interpolate, the preferred direction determined above is used to select the pixels to be used in interpolation. Additionally, similar to the interpolation calculations described above, the "estimate and adjust" approach (for example, expression (9)) is used in the interpolation calculations. For ease of understanding, the following description is focused on the interpolation of the red plane since the interpolation of the blue plane may be performed in a similar manner.

Figure 18:
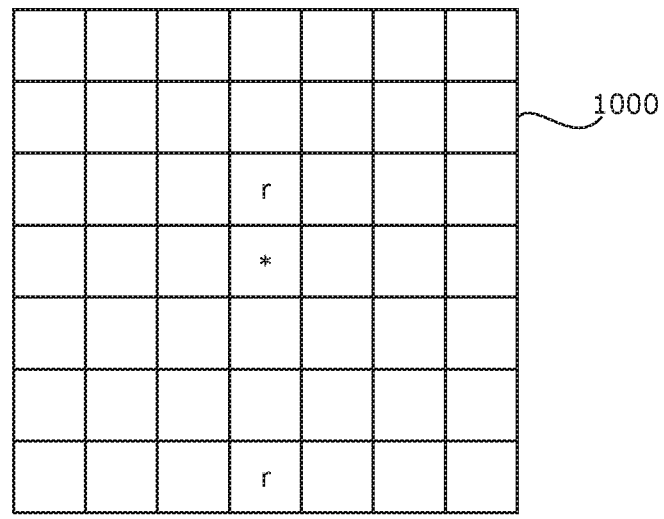
FIG. 18 illustrates an exemplary subset of the seven by seven array of pixels of FIG. 16 that may be used in vertical interpolation to calculate the red component value associated with the output pixel.

In some examples, the preferred direction is the vertical direction. FIG. 18 illustrates a subset of the seven by seven array of pixels 1000 of FIG. 17 that may be used in vertical interpolation to calculate the red component value "r" for the output pixel. The interpolated red value red_v is given according to expression (34).

$$\mathrm{red}\_v = (3*r(2,3) + r(2,6))/4 \quad (34)$$

Figure 19:
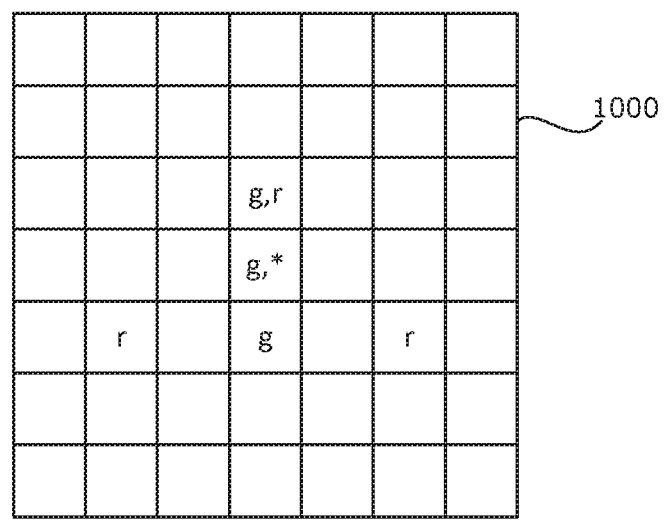
FIG. 19 illustrates an exemplary subset of the seven by seven array of pixels of FIG. 16 that may be used in horizontal interpolation to calculate the red component value associated with the output pixel.

In some examples, the preferred direction is the horizontal direction. FIG. 19 illustrates a subset of the seven by seven array of pixels 1000 of FIG. 16 that may be used in horizontal interpolation to calculate the red component value "r" for the output pixel. Similar to the description above, the differences dn and ds are calculated according to expressions (35) and (36) and used to determine whether the pixels to the "north" or the "south" of the (3,3) position will be used for interpolation.

$$dn = |g(3,3) - g(2,3)| \quad (35)$$

$$ds = |g(3,3) - g(4,3)| \quad (36)$$

In some examples, when dn<(ds-thres) where thres is a threshold value, then the "north" pixels will be used for interpolation. The calculation using the "north" pixels is according to expressions (37)-(39).

$$\mathrm{avg}n = r(2,3) \quad (37)$$

$$\mathrm{delta}\_n = g(3,3) - g(2,3) \quad (38)$$

$$\mathrm{red}\_h = \mathrm{avg}n + \mathrm{delta}\_n \quad (39)$$

In other examples, when ds<(dn-thres), where thres is a threshold value, then the "south" pixels will be used for interpolation. The calculation using the "south" pixels is according to expressions (40)-(42). In yet other examples, when neither dn nor ds is significantly smaller than the other value, the interpolated value is given according to expression (43).

$$\mathrm{avg}s = (r(4,1) + r(4,5))/2 \quad (40)$$

$$\mathrm{delta}\_s = g(3,3) - g(4,3) \quad (41)$$

$$\mathrm{red}\_h = \mathrm{avg}s + \mathrm{delta}\_s \quad (42)$$

$$\mathrm{red}\_h = (2*r(2,3) + r(4,1) + r(4,5))/4 \quad (43)$$

Figure 20:
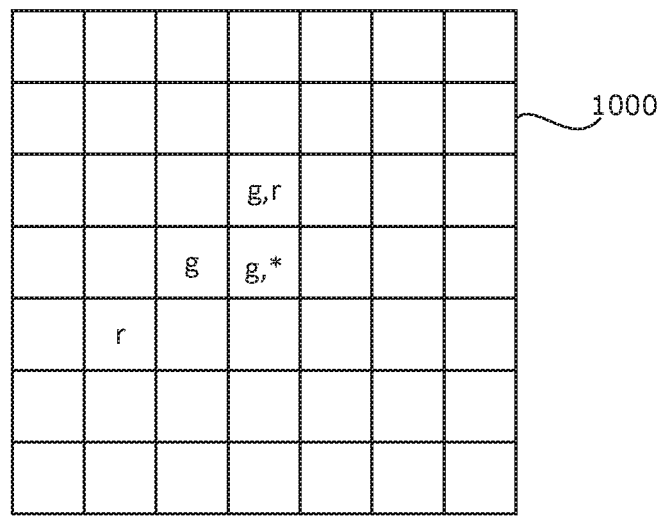
FIG. 20 illustrates an exemplary subset of the seven by seven array of pixels of FIG. 16 that may be used in interpolation in the slash direction to calculate the red component value associated with the output pixel.

In some examples, the slash direction is the preferred direction. FIG. 20 illustrates a subset of the seven by seven array of pixels 1000 of FIG. 16 that may be used in interpolation in the slash direction to calculate the red component value "r" associated with the output pixel. The calculation using the slash direction is according to expressions (44)-(46).

$$\mathrm{avg} = (3*r(2,3) + r(4,1))/4 \quad (44)$$

$$\mathrm{delta}\_g = g(3,3) - (g(2,3) + g(3,2))/2 \quad (45)$$

$$\mathrm{red}\_sl = \mathrm{avg} + \mathrm{delta}\_g \quad (46)$$

Figure 21:
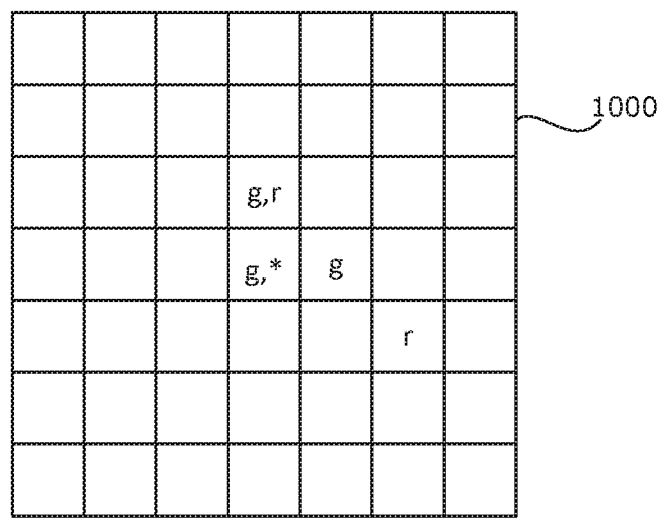
FIG. 21 illustrates an exemplary subset of the seven by seven array of pixels of FIG. 16 that may be used in interpolation in the backslash direction to calculate the red component value associated with the output pixel.

In some examples, the backslash direction is the preferred direction. FIG. 21 illustrates a subset of the seven by seven array of pixels 1000 of FIG. 16 that may be used in interpolation in the backslash direction to calculate the red component value "r" for the output pixel. The calculation using the slash direction is according to expressions (47)-(49).

$$\mathrm{avg} = (3*r(2,3) + r(4,5))/4 \quad (47)$$

$$\mathrm{delta}\_g = g(3,3) - (g(2,3) + g(3,4))/2 \quad (48)$$

$$\mathrm{red}\_bs = \mathrm{avg} + \mathrm{delta}\_g \quad (49)$$

In other examples, when there is no preferred direction, the interpolated value is given by an average of the neighboring pixels. For example, the interpolated value is given according to expression (50).

$$\mathrm{red}\_\mathrm{nodir} = (2*x(2,3) + x(4,1) + x(4,5))/4 \quad (50)$$

The calculations in the interpolation of the red color plane and the blue color plane depends on the pixel location within the color filter array (for example, the color filter array 200). However, even though the calculations are dependent on the pixel location, the calculations may be performed using a similar estimate and adjust approach while taking into account the configuration of valid pixel values (for example, the available linear pixel values).

Figure 22:
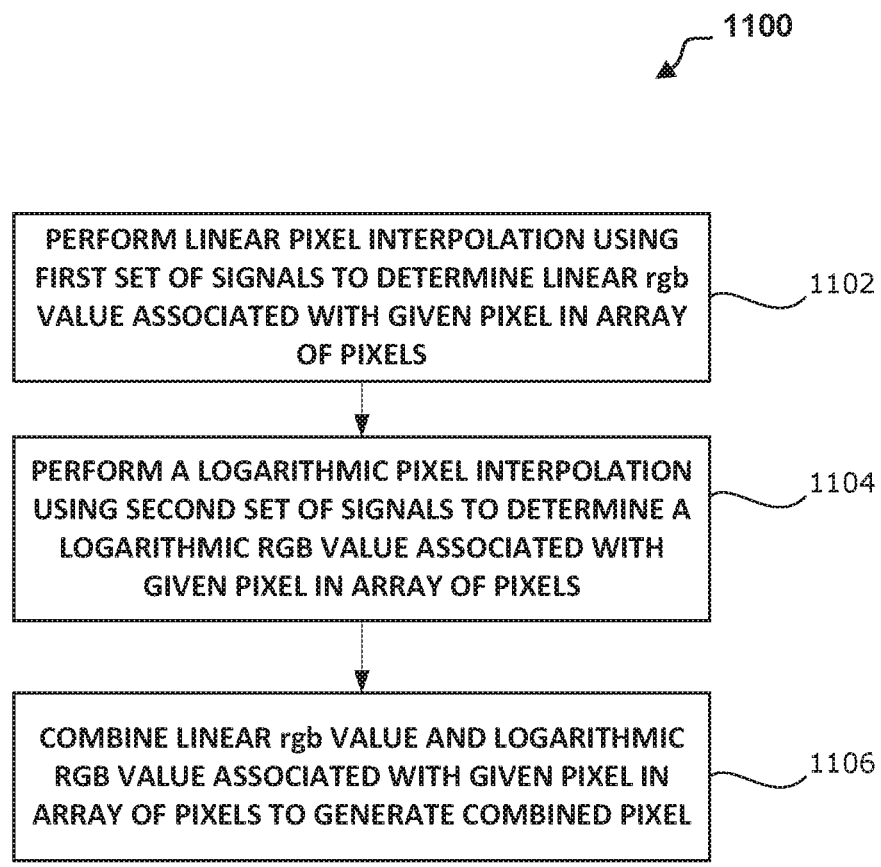
FIG. 22 illustrates an exemplary process flow for an adaptive demosaic algorithm stored in a non-transitory computer-readable medium and to be utilized with an image sensor having both linear and logarithmic pixels.

FIG. 22 illustrates an exemplary flowchart for an adaptive demosaic algorithm 1100 stored in a non-transitory computer-readable medium and executed by a processing device. For ease of understanding, the adaptive demosaic algorithm 1100 of FIG. 22 will be described with respect to the memory and the processing device of the controller 150. However, the adaptive demosaic algorithm 1100 may be used with a non-transitory computer-readable medium or a processing device that is external to the controller 150.

The adaptive demosaic algorithm 1100, executed by the processing device of the controller 150, performs a linear pixel interpolation using a first set of signals to determine a linear red-green-blue (rgb) value associated with a given pixel in an array of pixels (at block 1102). The adaptive demosaic algorithm 1100, executed by the processing device of the controller 150, performs a logarithmic pixel interpolation using a second set of signals to determine a logarithmic Red-Green-Blue (RGB) value associated with the given pixel in the array of pixels (at block 1104). Responsive to determining the linear rgb value and the logarithmic RGB value associated with the given pixel in the array of pixels, the adaptive demosaic algorithm 1100, executed by the processing device of the controller 150, combines the linear rgb value and the logarithmic RGB value associated with the given pixel in the array of pixels to generate a combined pixel value associated with the given pixel in the array of pixels (at block 1106).

The circuitries and methods disclosed herein also work for a monochrome sensor that comprises both linear and logarithmic pixels. In such case, a combined pixel value associated with a given pixel may be calculated by summing a linear pixel value and a logarithmic pixel value for the given pixel. For the monochrome sensor, blocks 402, 406, 408 and 412 in FIG. 4 may be omitted. At any given pixel location, the physical pixel is either a linear pixel or a logarithmic pixel. In the case that the given pixel is a physical linear pixel, the linear pixel value may be directly obtained and the logarithmic pixel value for the given pixel may be calculated by interpolating (i.e., an interpolation operation) the logarithmic pixel values from neighboring physical logarithmic pixels. In the case that the given pixel is a physical logarithmic pixel, the logarithmic pixel value may be directly obtained and the linear pixel value for the given pixel may be calculated by interpolating (i.e., an interpolation operation) the linear pixel values from neighboring physical linear pixels. The interpolating operations may be done adaptively taking edge information into account, which is simpler than the demosaicing procedure described above because there is only one color plane to be interpolated.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claims.

Accordingly, it is to be understood that the above description is intended to be illustrative and not restrictive. Many examples and applications other than the examples provided would be apparent upon reading the above description. The scope should be determined, not with reference to the above description, but should instead be determined with reference to the appended claims, along with the full scope of equivalents to which the claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A signal processing circuit comprising:
    image processing circuitry including
        first circuitry configured to receive a first set of signals corresponding to linear pixels in an array of pixels;
        second circuitry configured to receive a second set of signals corresponding to logarithmic pixels in the array of pixels;
        third circuitry configured to perform a linear pixel interpolation using the first set of signals to determine a linear red-green-blue (rgb) value associated with a given pixel in the array of pixels;
        fourth circuitry configured to perform a logarithmic pixel interpolation using the second set of signals to determine a logarithmic Red-Green-Blue (RGB) value associated with the given pixel in the array of pixels; and
        responsive to determining the linear rgb value and the logarithmic RGB value associated with the given pixel in the array of pixels, fifth circuitry is configured to combine the linear rgb value and the logarithmic RGB value associated with the given pixel in the array of pixels to generate a combined pixel value associated with the given pixel in the array of pixels.

2. The signal processing circuit of claim 1, wherein, to perform the linear pixel interpolation using the first set of signals, the third circuitry is further configured to perform adaptive demosaicing of the first set of signals using first edge information, and wherein, to perform the logarithmic pixel interpolation using the second set of signals, the fourth circuitry is further configured to perform adaptive demosaicing of the second set of signals using second edge information.

3. The signal processing circuit of claim 1, wherein the image processing circuitry further includes
    sixth circuitry configured to perform linear color correction on the linear rgb value associated with the given pixel in the array of pixels; and
    seventh circuitry configured to perform logarithmic color correction on the logarithmic RGB value associated with the given pixel in the array of pixels.

4. The signal processing circuit of claim 3, wherein, to perform the logarithmic color correction on the logarithmic RGB value associated with the given pixel in the array of pixels, the sixth circuitry is further configured to:
    perform logarithmic to linear mapping on the logarithmic RGB value associated with the given pixel in the array of pixels to generate a linear-mapped pixel value associated with the given pixel in the array of pixels,
    perform color matrix correction on the linear-mapped pixel value associated with the given pixel in the array of pixels to generate a color-corrected and linear-mapped pixel value associated with the given pixel in the array of pixels, and
    perform linear to logarithmic mapping on the color-corrected and linear-mapped pixel value associated with the given pixel in the array of pixels to generate a color-corrected logarithmic RGB value associated with the given pixel in the array of pixels, and
    wherein, to combine the linear rgb value and the logarithmic RGB value associated with the given pixel in the array of pixels to generate the combined pixel value associated with the given pixel in the array of pixels, the fifth circuitry is further configured to combine a color-corrected linear rgb value and the color-corrected logarithmic RGB value associated with the given pixel in the array of pixels.

5. The signal processing circuit of claim 1, wherein the first set of signals includes linear pixel values, wherein the second set of signals includes logarithmic pixel values, and wherein the image processing circuitry further includes
    eighth circuitry configured to multiply the linear pixel values by first color dependent gain values to perform white balancing in response to receiving the first set of signals; and
    ninth circuitry configured to shift the logarithmic pixel values by second color dependent offset values to perform white balancing in response to receiving the second set of signals.

6. The signal processing circuit of claim 1, wherein, to combine the linear rgb value and the logarithmic RGB value associated with the given pixel in the array of pixels to generate the combined pixel value, the fifth circuitry is further configured to sum the linear rgb value and the logarithmic RGB value associated with the given pixel in the array of pixels to generate the combined pixel value associated with the given pixel in the array of pixels.

7. The signal processing circuit of claim 1, wherein the image processing circuitry further includes tenth circuitry configured to generate a combined image based on the combined pixel value associated with the given pixel in the array of pixels.

8. A method for processing an image, the method comprising:
    receiving a first set of signals corresponding to linear pixels in an array of pixels;
    receiving a second set of signals corresponding to logarithmic pixels in the array of pixels;
    performing a linear pixel interpolation using the first set of signals to determine a linear red-green-blue (rgb) value associated with a given pixel in the array of pixels;
    performing a logarithmic pixel interpolation using the second set of signals to determine a logarithmic Red-Green-Blue (RGB) value associated with the given pixel in the array of pixels; and
    responsive to determining the linear rgb value and the logarithmic RGB value associated with the given pixel in the array of pixels, combining the linear rgb value and the logarithmic RGB value associated with the given pixel in the array of pixels to generate a combined pixel value associated with the given pixel in the array of pixels.

9. The method of claim 8, wherein performing the linear pixel interpolation using the first set of signals further includes performing adaptive demosaicing of the first set of signals using first edge information, and wherein performing the logarithmic pixel interpolation using the second set of signals further includes performing adaptive demosaicing of the second set of signals using second edge information.

10. The method of claim 8, further comprising:
    performing linear color correction on the linear rgb value associated with the given pixel in the array of pixels; and
    performing logarithmic color correction on the logarithmic RGB value associated with the given pixel in the array of pixels.

11. The method of claim 10, wherein performing the logarithmic color correction on the logarithmic RGB value associated with the given pixel in the array of pixels further includes
    performing logarithmic to linear mapping on the logarithmic RGB value associated with the given pixel in the array of pixels to generate a linear-mapped pixel value associated with the given pixel in the array of pixels;
    performing color matrix correction on the linear-mapped pixel value associated with the given pixel in the array of pixels to generate a color-corrected and linear-mapped pixel value associated with the given pixel in the array of pixels; and
    performing linear to logarithmic mapping on the color-corrected and linear-mapped pixel value associated with the given pixel in the array of pixels to generate a color-corrected logarithmic RGB value associated with the given pixel in the array of pixels, and
    wherein combining the linear rgb value and the logarithmic RGB value associated with the given pixel in the array of pixels to generate the combined pixel value associated with the given pixel in the array of pixels further includes combining the linear rgb value and the color-corrected logarithmic RGB value associated with the given pixel in the array of pixels.

12. The method of claim 8, wherein the first set of signals includes linear pixel values, wherein the second set of signals includes logarithmic pixel values, the method further comprising:
    multiplying the linear pixel values by first color dependent gain values to perform white balancing in response to receiving the first set of signals; and
    shifting the logarithmic pixel values by second color dependent offset values to perform white balancing in response to receiving the second set of signals.

13. The method of claim 8, wherein combining the linear rgb value and the logarithmic RGB value associated with the given pixel in the array of pixels to generate the combined pixel value further includes summing the linear rgb value and the logarithmic RGB value associated with the given pixel in the array of pixels to generate the combined pixel value associated with the given pixel in the array of pixels.

14. The method of claim 8, further comprising generating a combined image based on the combined pixel value associated with the given pixel in the array of pixels.

15. An imaging device comprising:
an array of pixels including linear pixels and logarithmic pixels, the linear pixels are configured to output a first set of signals based on light incident upon the linear pixels, and the logarithmic pixels are configured to output a second set of signals based on the light incident upon the logarithmic pixels; and
image processing circuitry configured to
receive the first set of signals and the second set of signals,
perform a linear pixel interpolation using the first set of signals to determine a linear red-green-blue (rgb) value associated with a given pixel in the array of pixels,
perform a logarithmic pixel interpolation using the second set of signals to determine a logarithmic Red-Green-Blue (RGB) value associated with the given pixel in the array of pixels, and
responsive to determining the linear rgb value and the logarithmic RGB value associated with the given pixel in the array of pixels, combine the linear rgb value and the logarithmic RGB value associated with the given pixel in the array of pixels to generate a combined pixel value associated with the given pixel in the array of pixels.

16. The imaging device of claim 15, further comprising a color filter array disposed on the array of pixels and configured to filter the light incident upon the given pixel in the array of pixels.

17. The imaging device of claim 15, wherein, to perform the linear pixel interpolation using the first set of signals, the image processing circuitry is further configured to perform adaptive demosaicing of the first set of signals using first edge information, and wherein, to perform the logarithmic pixel interpolation using the second set of signals, the image processing circuitry is further configured to perform adaptive demosaicing of the second set of signals using second edge information.

18. The imaging device of claim 15, wherein the image processing circuitry is further configured to:
perform linear color correction on the linear rgb value associated with the given pixel in the array of pixels, and
perform logarithmic color correction on the logarithmic RGB value associated with the given pixel in the array of pixels.

19. The imaging device of claim 18, wherein, to perform the logarithmic color correction on the logarithmic RGB value associated with the given pixel in the array of pixels, the image processing circuitry is further configured to:
perform logarithmic to linear mapping on the logarithmic RGB value associated with the given pixel in the array of pixels to generate a linear-mapped pixel value associated with the given pixel in the array of pixels,
perform color matrix correction on the linear-mapped pixel value associated with the given pixel in the array of pixels to generate a color-corrected and linear-mapped pixel value associated with the given pixel in the array of pixels, and
perform linear to logarithmic mapping on the color-corrected and linear-mapped pixel value associated with the given pixel in the array of pixels to generate a color-corrected logarithmic RGB value associated with the given pixel in the array of pixels, and
wherein, to combine the linear rgb value and the logarithmic RGB value associated with the given pixel in the array of pixels to generate the combined pixel value associated with the given pixel in the array of pixels, the image processing circuitry is further configured to combine the linear rgb value and the color-corrected logarithmic RGB value associated with the given pixel in the array of pixels.

20. The imaging device of claim 15, wherein the image processing circuitry is further configured to generate a combined image based on the combined pixel value associated with the given pixel in the array of pixels.

21. A non-transitory computer-readable medium comprising instructions that, when executed by an electronic processor, perform a set of operations, the set of operations comprising:
performing a linear pixel interpolation using a first set of signals to determine a linear red-green-blue (rgb) value associated with a given pixel in an array of pixels;
performing a logarithmic pixel interpolation using a second set of signals to determine a logarithmic Red-Green-Blue (RGB) value associated with the given pixel in the array of pixels; and
responsive to determining the linear rgb value and the logarithmic RGB value associated with the given pixel in the array of pixels, combining the linear rgb value and the logarithmic RGB value associated with the given pixel in the array of pixels to generate a combined pixel value associated with the given pixel in the array of pixels.

\* \* \* \* \*